(12) United States Patent
Mitsugi (10) Patent No.: US 7,545,308 B2
(45) Date of Patent: Jun. 9, 2009

(54) RADIO COMMUNICATION APPARATUS, METHOD AND PROGRAM

(75) Inventor: Jun Mitsugi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/923,832

(22) Filed: Aug. 24, 2004

(65) Prior Publication Data

US 2005/0162304 A1 Jul. 28, 2005

(30) Foreign Application Priority Data

Jan. 26, 2004 (JP) ............................. 2004-017337

(51) Int. Cl.
 *G01S 7/40* (2006.01)
(52) U.S. Cl. ........................... 342/52; 342/20; 370/329; 455/509
(58) Field of Classification Search ................ 342/52
 See application file for complete search history.

(56) References Cited

U.S. PATENT DOCUMENTS

| 6,870,815 | B2 * | 3/2005 | McFarland et al. .......... 370/250 |
| 6,954,171 | B2 * | 10/2005 | Husted et al. .................. 342/57 |
| 7,024,188 | B2 * | 4/2006 | Khun-Jush et al. .......... 455/423 |
| 2002/0155811 | A1 | 10/2002 | Prismantas et al. |
| 2004/0132411 | A1 * | 7/2004 | Li ........................... 455/67.13 |
| 2004/0146022 | A1 * | 7/2004 | Lewis et al. ................. 370/331 |
| 2004/0151137 | A1 * | 8/2004 | McFarland et al. .......... 370/329 |
| 2004/0165564 | A1 * | 8/2004 | Kim et al. .................... 370/338 |
| 2005/0007979 | A1 * | 1/2005 | Tsien et al. .................. 370/329 |
| 2005/0054294 | A1 * | 3/2005 | Khun-Jush et al. ......... 455/63.1 |
| 2005/0083962 | A1 * | 4/2005 | Khun-Jush et al. .......... 370/445 |

FOREIGN PATENT DOCUMENTS

| JP | 6-37762 | 2/1994 |
| JP | 2001-285301 | 10/2001 |
| JP | 2002-135831 | 5/2002 |
| WO | WO 03/050560 A1 | 6/2003 |

* cited by examiner

*Primary Examiner*—Thomas H Tarcza
*Assistant Examiner*—Matthew M Barker
(74) *Attorney, Agent, or Firm*—Oblon, Spivak, McClelland, Maier & Neustadt, P.C.

(57) ABSTRACT

An apparatus and method for operating with a first radio system and a second radio system. First and second information is stored in the apparatus. The first information indicates at least one first channel which is used by the first system if a signal of the first system is detectable, and the second information indicating at least one second which fails to be used by the first system. A controller controls the second system to switch from the second channel to a third channel if the detector detects that a signal received through the third communication channel fails to be used in the first system. The second system includes a plurality of radios. The apparatus includes a modulation/demodulation unit that modulates and demodulates signals from the plurality of the radio systems. The signal are compatible are orthogonal frequency division multiplexed and are spread.

5 Claims, 5 Drawing Sheets

RADIO COMMUNICATION APPARATUS, METHOD AND PROGRAM

CROSS-REFERENCE TO RELATED APPLICATIONS

This application is based upon and claims the benefit of priority from prior Japanese Patent Application No. 2004-017337, filed Jan. 26, 2004, the entire contents of which are incorporated herein by reference.

BACKGROUND OF THE INVENTION

1. Field of the Invention

The present invention relates to a radio communication apparatus, method and program for controlling communication in a wireless LAN system, and more particularly to a radio communication apparatus, method and program characterized in the process of assigning a channel.

2. Description of the Related Art

The IEEE802.11 wireless LAN system can use a plurality of frequency bands, each band containing a plurality of channels. A wireless LAN communication apparatus can select one of the channels, and perform communication using it. Some of the frequency bands may be commonly used by another system. For example, the LAN system and a radar system commonly use a frequency band of 5 GHz.

For example, in Europe, the wireless LAN system can use frequency bands of 5.15 to 5.25 GHz, 5.25 to 5.35 GHz, and 5.47 to 5.725 GHz. The channels included in the frequency band of 5.15 to 5.25 GHz are allocated for indoor use, and their transmission power is low. Therefore, there is no possibility of their interference with a radar system, and hence it is not necessary to detect a radar signal when using the band. On the other hand, the channels included in the frequency bands of 5.25 to 5.35 GHz and 5.47 to 5.725 GHz can be used both inside and outside, and their transmission power is high. Accordingly, they may interfere with a radar system, and it is necessary, when using those bands, to check whether or not there is a radar signal. In those bands, the channels in which no radar signals are detected can be used.

Jpn. Pat. Appln. KOKAI Publication No. 2001-285301, for example, has proposed a technique for utilizing the periodicity of radar pulses and using a wireless LAN system only for the period in which radar pulses do not interfere with wireless LAN system signals, thereby avoiding interference therebetween.

However, it violates European Telecommunication Standards Institute (ETSI) European standards (EN) 301 893 v1.2.2 to utilize the periodicity of radar pulses and use a wireless LAN system only for the period in which radar pulses do not interfere with wireless LAN system signals. ETSI EN 301 893 v1.2.2 stipulates that when using a channel included in the frequency bands of 5.25 to 5.35 GHz and 5.47 to 5.725 GHz, a period of 60 seconds or more must be prepared to detect a radar. In other words, when using a channel commonly used with a radar system, the wireless LAN system cannot perform communication for at least 60 seconds after it is turned on.

Furthermore, ETSI EN 301 893 v1.2.2 stipulates that where there is a frequency band containing a radar channel, a radar channel will be checked for the presence of a radar signal. When using the channels, it is necessary to confirm that no radar signals exist in the channels. Further, since the probability of selecting a given channel will be the same for all channels, the channels that do not require the detection of a radar signal cannot always be used. Therefore, even a channel that requires detection of a radar signal must be selected sooner or later, and in this case, a detection period of at least 60 seconds is required.

BRIEF SUMMARY OF THE INVENTION

It is an object of the invention to provide a radio communication apparatus capable of accessing a wireless LAN system with little waiting time, and a radio communication method and program enabling the apparatus to realize such quick access.

According to a first aspect of the invention, there is provided a radio communication apparatus of performing a communication in association with a first radio communication system and a second radio communication system, comprising:

a storage which stores first information and second information, the first information indicating at least one first communication channel which is failed to be used by the second radio communication system if a signal of the first radio communication system is detectable, and the second information indicating at least one second communication channel which is used by the second radio communication system even if the signal of the first radio communication system is detectable;

a selector which randomly selects a third communication channel from a plurality of communication channels including the first communication channel and the second communication channel, if a communication is performed using the second radio communication system;

a determination unit configured to determine whether or not the third communication channel is identical to the at least one first communication channel, referring to the first information;

a detector which detects whether or not the signal of the first radio communication system is detectable; and a controller which controls the second radio communication system to start the communication using the second communication channel if the determination unit determines that the third communication channel is identical to the at least one first communication channel, the controller controlling the second radio communication system to switch from the second communication channel to the third communication channel if the detector detects that the signal of the first radio communication system is failed to be detectable, the communication by the second radio communication system being continued using the second communication channel, if the detector detects that the signal of the first radio communication system is detectable.

According to a second aspect of the invention, there is provided a radio communication apparatus of performing a communication in association with a radar system and a radio communication system comprising:

a storage which stores first information and second information, the first information indicating at least one first communication channel which is failed to be used by the radio communication system if a signal of the radar system is detectable, the second information indicating at least one second communication channel which is used by the radio communication system even if a signal of the radar system is detectable;

a selector which randomly selects a third communication channel from a plurality of communication channels including the first communication channel and the second communication channel, if communication is performed using the radio communication system;

a determination unit configured to determine whether or not the third communication channel is identical to the at least one first communication channel, referring to the first information;

a detector which detects whether or not a signal of the radar system is detectable; and a controller which controls the radio communication system to start communication using the second communication channel if the determination unit determines that the third communication channel is identical to the at least one first communication channel, the controller controlling the radio communication system to switch from the second communication channel to the third communication channel if the detector detects that the signal of the radar system is failed to be detectable, the communication by the radio communication system being continued using the second communication channel, if the detector detects that the signal of the radar system is detectable.

According to a third aspect of the invention, there is provided a radio communication apparatus of performing a communication in association with a radar system and a radio communication system, comprising:

a storage which stores first information and second information, the first information indicating at least one first communication channel which is failed to be used by the radio communication system if a signal of the radar system is detectable, the second information indicating at least one second communication channel which is used by the radio communication system even if the signal of the radar system is detectable;

a selector which randomly selects a third communication channel from a plurality of communication channels including the first communication channel and the second communication channel, if a communication is performed using the radio communication system;

a determination unit configured to determine whether or not the third communication channel is identical to the at least one first communication channel, referring to the first information;

a detector which detects whether or not the signal of the radar system is detectable;

an idle time determining unit configured to determine whether or not an idle time not less than a period is secured, if the determination unit determines that the third communication channel is identical to the at least one first communication channel, the idle time corresponding to a period in which data is failed to be transmitted or received during communication by the radio communication system; and a controller which controls the radio communication system to start a communication using the second communication channel if the determination unit determines that the third communication channel is identical to the at least one first communication channel, the controller controlling the radio communication system to switch from the second communication channel to the third communication channel if the idle time determining unit determines that the idle time is secured, and to switch from the third communication channel to the second communication channel if the detector detects that the signal of the radar system is detectable, the communication by the radio communication system being continued using the second communication channel if the idle time determining unit determines that the idle time is failed to be secured, and using the third communication channel if the detector detects that the signal of the radar system is failed to be detectable.

According to a fourth aspect of the invention, there is provided a radio communication method comprising:

storing first information and second information, the first information indicating at least one first communication channel which is failed to be used by a second radio communication system if a signal of a first radio communication system is detectable, and the second information indicating at least one second communication channel which is used by the second radio communication system even if the signal of the first radio communication system is detectable;

randomly selecting a third communication channel from a plurality of communication channels including the first communication channel and the second communication channel, if a communication is performed using the second radio communication system;

determining whether or not the third communication channel is identical to the at least one first communication channel, referring to the first information;

detecting whether or not a signal of the first radio communication system is detectable;

controlling the second radio communication system to start communication using the second communication channel, if it is determined that the third communication channel is identical to the at least one first communication channel;

controlling the second radio communication system to switch from the second communication channel to the third communication channel, if it is detected that the signal of the first radio communication system is failed to be detectable; and continuing the communication by the second radio communication system using the second communication channel, if it is detected that the signal of the first radio communication system is detectable.

According to a fifth aspect of the invention, there is provided a radio communication method comprising:

storing first information and second information, the first information indicating at least one first communication channel which is failed to be used by a radio communication system if a signal of a radar system is detectable, and the second information indicating at least one second communication channel which is used by the radio communication system even if the signal of the radar system is detectable;

randomly selecting a third communication channel from a plurality of communication channels including the first communication channel and the second communication channel, if a communication is performed using the radio communication system;

determining whether or not the third communication channel is identical to the at least one first communication channel, referring to the first information;

detecting whether or not the signal of the radar system is detectable;

controlling the radio communication system to start communication using the second communication channel, if it is determined that the third communication channel is identical to the at least one first communication channel;

controlling the radio communication system to switch from the second communication channel to the third communication channel, if it is detected that the signal of the radar system is failed to be detectable; and continuing the communication by the radio communication system using the second communication channel, if it is detected that the signal of the radar system is detectable.

According to a sixth aspect of the invention, there is provided a radio communication method comprising:

storing first information and second information, the first information indicating at least one first communication channel which is failed to be used by a radio communication system if a signal of a radar system is detectable, and the second information indicating at least one second communication channel which is used by the radio communication system even if the signal of the radar system is detectable;

randomly selecting a third communication channel from a plurality of communication channels including the first communication channel and the second communication channel, if a communication is performed using the radio communication system;

determining whether or not the third communication channel is identical to the at least one first communication channel, referring to the first information;

detecting whether or not the signal of the radar system is detectable;

determining whether or not an idle time not less than a period is secured, if it is determined that the third communication channel is identical to the at least one first communication channel, the idle time corresponding to a period in which data is failed to be transmitted or received during communication by the radio communication system;

controlling the radio communication system to start communication using the second communication channel, if it is determined that the third communication channel is identical to the at least one first communication channel;

controlling the radio communication system to switch from the second communication channel to the third communication channel, if it is determined that the idle time is secured;

controlling the radio communication system to switch from the third communication channel to the second communication channel, if it is detected that the signal of the radar system is detectable;

continuing the communication by the radio communication system using the second communication channel, if it is determined that the idle time is failed to be secured; and continuing the communication by the radio communication system using the third communication channel, if it is detected that the signal of the radar system is failed to be detectable.

According to a seventh aspect of the invention, there is provided a radio communication program stored in a computer readable medium, comprising:

means for instructing a computer to store first information and second information, the first information indicating at least one first communication channel is failed to be used by a second radio communication system if a signal of a first radio communication system is detectable, and the second information indicating at least one second communication channel which is used by the second radio communication system even if the signal of the first radio communication system is detectable;

means for instructing the computer to randomly select a third communication channel from a plurality of communication channels including the first communication channel and the second communication channel, if communication is performed using the second radio communication system;

means for instructing the computer to determine whether or not the third communication channel is identical to the at least one first communication channel, referring to the first information;

means for instructing the computer to detect whether or not the signal of the first radio communication system is detectable;

means for instructing the computer to control the second radio communication system to start communication using the second communication channel, if it is determined that the third communication channel is identical to the at least one first communication channel;

means for instructing the computer to control the second radio communication system to switch from the second communication channel to the third communication channel, if it is detected that the signal of the first radio communication system is failed to be detectable; and means for instructing the computer to continue the communication by the second radio communication system using the second communication channel, if it is detected that the signal of the first radio communication system is detectable.

DETAILED DESCRIPTION OF THE INVENTION

A radio communication apparatuses, methods and programs according to embodiments of the invention will be described in detail with reference to the accompanying drawings.

First Embodiment

Figure 1:
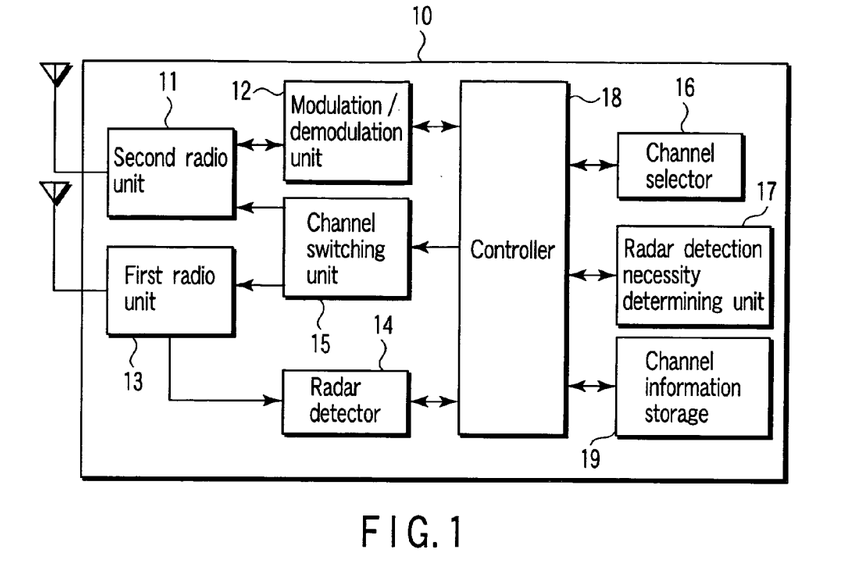
FIG. 1 is a block diagram illustrating a radio communication apparatus according to a first embodiment of the invention.

Referring first to FIG. 1, a radio communication apparatus 10 according to a first embodiment of the invention will be described.

The radio communication apparatus 10 has two radio units, one for data communication and the other for radar detection. Thus, the apparatus 10 can concurrently perform data communication and radar detection. As shown in FIG. 1, the radio communication apparatus 10 comprises a second radio unit 11, modulation/demodulation unit 12, first radio unit 13, radar detector 14, channel switching unit 15, channel selector 16, radar detection necessity determining unit 17, controller 18 and channel information storage 19.

Figure 2:
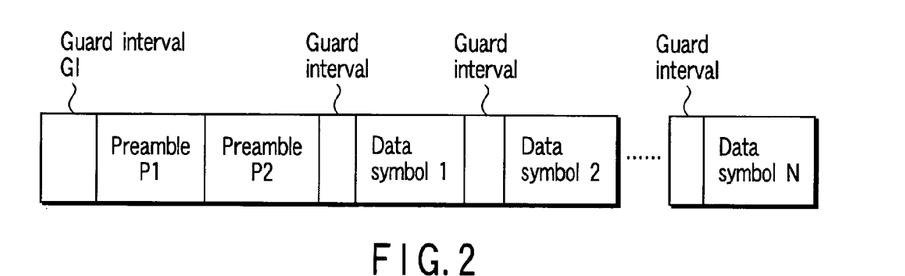
FIG. 2 is a view illustrating the format of a signal received or transmitted by the radio communication apparatus shown in FIG. 1.

The second radio unit 11 enables a wireless LAN system utilizing multi-carrier radio transmission (OFDM: Orthogonal Frequency Division Multiplexing), and transmits and receives signals of the format shown in FIG. 2. This type of signal contains a preamble, guard interval and data symbol. The preamble is used to detect the leading position of a signal for synchronization. The guard interval is used to suppress inter-symbol interference that may occur between adjacent symbols. The data symbol contains to-be-transmitted data. The modulation/demodulation unit 12 demodulates the signal received by the second radio unit 11, and modulates the signal to be transmitted by the second radio unit 11.

The first radio unit 13 is used to detect a radar, and arranged to receive radar pulses transmitted by a radar transmitter through a designated channel. The radar detector 14 determines whether or not the signal received by the first radio unit 13 is a radar pulse signal, thereby detecting whether or not a radar signal exists in the designated channel.

Figure 3:
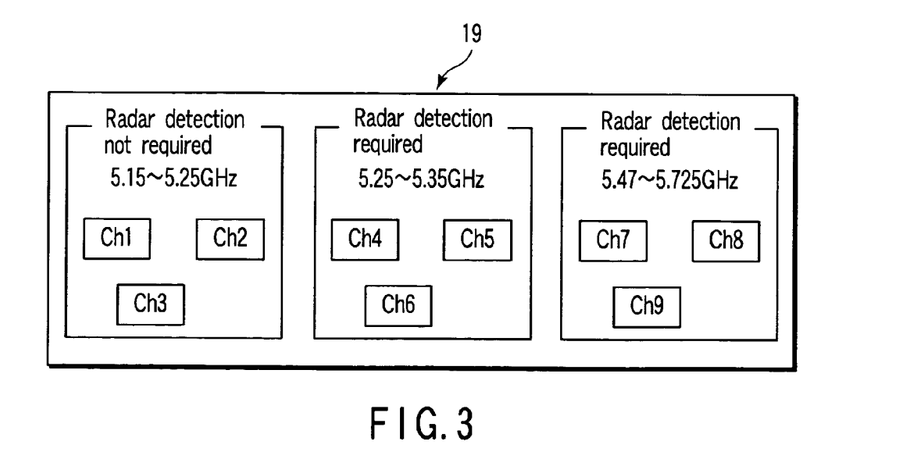
FIG. 3 is a view illustrating channel information stored in the channel information storage shown in FIG. 1.

The channel switching unit 15 switches the channels used by the radio communication apparatus 10. The radio communication apparatus 10 can use a plurality of channels in a wireless LAN system. For example, as shown in FIG. 3, three channels are contained in each of the three frequency bands. The channel switching unit 15 switches these channels. The channel selector 16 evenly selects the channels to avoid biased selection as stipulated in the European standards. Specifically, the channel selector 16 randomly selects usable channels (in the example of FIG. 3, nine channels Ch1 to Ch9) using, for example, random numbers. Alternatively, the channel selector 16 may accumulate statistical data concerning the channels used so far, and select the channels to make them be used at the same rate.

The radar detection necessity determining unit 17 determines whether or not the channel selected by the channel selector 16 requires radar detection. Specifically, if the channel selector 16 selects channel Ch5 shown in FIG. 3, the determining unit 17 determines that radar detection is required, and the first radio unit 13 and radar detector 14 attempt radar detection.

The channels that can be used in a wireless LAN system may contain a frequency band used by a radar as shown in FIG. 3. In the example of FIG. 3, a radar may use the frequency bands of 5.25 to 5.35 GHz and 5.47 to 5.725 GHz. Accordingly, if the channel selector 16 selects one of the channels contained in these frequency bands, the first radio unit 13 and radar detector 14 attempt radar detection. The other frequency band of 5.15 to 5.25 GHz is allocated for indoor only. Therefore, if the channel selector 16 selects a channel in this frequency band, it is not necessary to perform radar detection.

The channel information storage 19 stores channel information indicating frequency bands containing channels, the types of channels contained in the bands, and whether or not each of the frequency bands requires radar detection. This channel information is, for example, the information shown in FIG. 3.

The controller 18 controls the operation of each unit of the radio communication apparatus 10. Specifically, the controller 18 transfers the channel selected by the channel selector 16 to the channel switching unit 15 and radar detection necessity determining unit 17, and supplies the first radio unit 13 and radar detector 14 with a signal to instruct them to do radar detection, based on the determination result of the determining unit 17. The controller 18 also controls the following operation described with reference to FIG. 4.

Referring the flowchart of FIG. 4, a description will be given of an operation example of the radio communication apparatus 10.

Firstly, the radio communication apparatus 10 is turned on (step S11), and the channel selector 16 randomly selects a channel, to be used for communication, from the channel information stored in the channel information storage 19 (step S12). On the basis of the channel information, the radar detection necessity determining unit 17 determines whether or not the selected channel requires radar detection (step S13). If the selected channel requires radar detection (for example, if channel Ch5 is selected), the process proceeds to step S15, whereas if the selected channel does not require radar detection (for example, if channel Ch1 is selected), the process proceeds to step S14. At step S14, communication is started using the channel selected at step S12. That is, through the selected channel, the second radio unit 11 starts transmission/reception of a signal of the format shown in FIG. 2.

At step S15, the controller 18 selects, from the channel information, a channel that does not require radar detection, and starts communication using this channel. Specifically, communication is started using, for example, channel Ch3 shown in FIG. 3 that does not require radar detection. This channel is an arbitrary channel selected from a frequency band that does not require radar detection. The controller 18, for example, randomly selects a channel from such a frequency band. Upon starting communication, the first radio unit 13 and radar detector 14 starts radar detection in the channel selected at step S12 (step S16). Since ETSI EN 301 893 v1.2.2 stipulates that 60 seconds or more must be prepared to detect a radar, the process at step S16 requires 60 seconds or more in accordance with the stipulation.

The radar detector 14 determines whether or not the signal received by the first radio unit 13 is a radar pulse signal (step S17). If the received signal is a radar pulse signal, the process proceeds to step S18, whereas if the received signal is not a radar pulse signal, the process proceeds to step S19. At step S18, communication having started at step S15 is continued using the channel that does not require radar detection. At step S19, the channel switching unit 15 switches the channel to the channel selected at step S12, thereby continuing communication using this switched channel (step S20), since it is confirmed that the channel selected at step S12 is not used by a radar. Instead of switching the channels immediately after it is confirmed from radar detection that there is no radar signal, the channel switching unit 15 may switch the channels during the period in which the application used for current communication stops, or may switch the (communication) channels when the user switches the channels of a TV set. Alternatively, the channel switching unit 15 switches the (communication) channels during a CM time in a TV program if the user watches the program.

As described above, since the radio communication apparatus of the first embodiment has two radio units, one for data communication and the other for radar detection, data communication can be performed while radar detection is being performed as background processing. Accordingly, communication can be started with little waiting time after it is attempted to start communication in conformity with ETSI EN 301 893 v1.2.2. In other words, communication can be started without spending 60 seconds or more on radar detection before communication. Furthermore, since a channel is randomly selected from channel information at step S12, or selected based on statistical data, the channels contained in all usable frequency bands can be evenly utilized.

Second Embodiment

Figure 5:
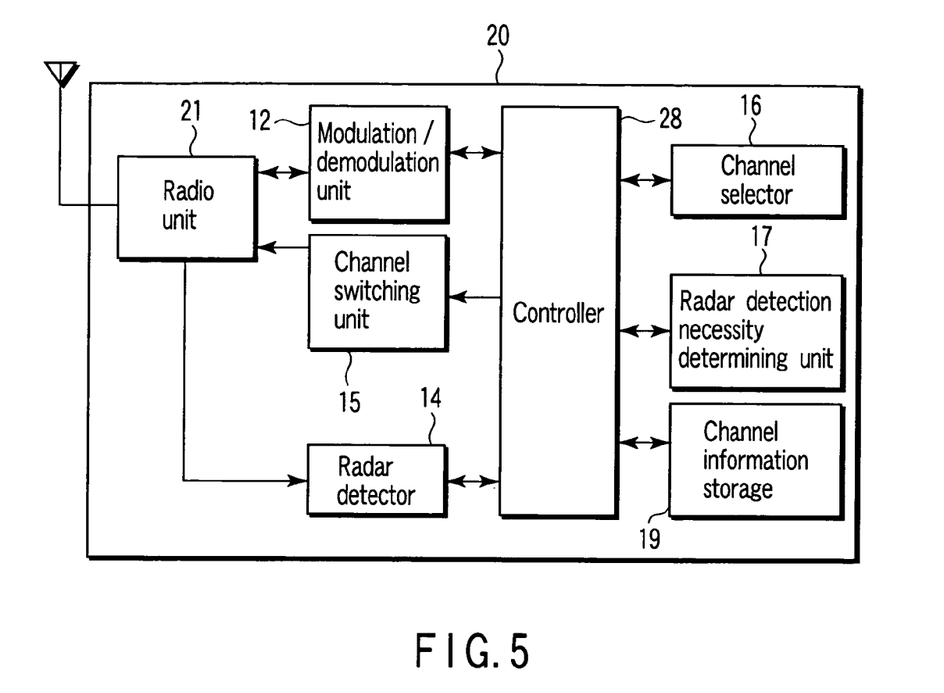
FIG. 5 is a block diagram illustrating a radio communication apparatus according to a second embodiment of the invention.

Referring to FIG. 5, a radio communication apparatus 20 according to a second embodiment of the invention will be described.

The radio communication apparatus 20 has only one radio unit, but prevents much time from being spent on radar detection before starting data communication, by using, for radar detection, an idle (IDLE) time for which data communication is suspended. The radio communication apparatus 20 differs from the radio communication apparatus 10 only in that the former has only one radio unit. Therefore, the elements of the apparatus 20 similar to those of the apparatus 10 are denoted by corresponding reference numerals, and no description is given thereof. As shown in FIG. 5, the radio communication apparatus 20 comprises a radio unit 21, modulation/demodulation unit 12, radar detector 14, channel switching unit 15, channel selector 16, radar detection necessity determining unit 17, controller 18 and channel information storage 19.

The radio unit 21 has functions corresponding to both the functions of the first and second radio units 11 and 13 employed in the first embodiment. Specifically, the radio unit 21 realizes data communication using a wireless LAN system that utilizes multi-carrier radio transmission, and attempts to receive, in a designated channel, a radar pulse signal emitted from a radar transmitter. Since the second embodiment employs only one radio unit (i.e., only the radio unit 21), it differs from the first embodiment in that in the former, it cannot perform data communication while detecting a radar as background processing.

The controller 28 controls each unit of the radio communication apparatus 20 as in the first embodiment. However, the contents of control differ. The controller 28 estimates an idle time in which data communication is suspended, and makes the radio unit 21 perform radar detection during the idle time. In data communication using a wireless LAN system, the idle time may exist like IDLE periods T1 and T2 shown in FIG. 6. If the controller 28 determines that the idle time is a predetermined period or more (60 seconds or more if the idle time should conform to ETSI EN 301 893 v1.2.2), it controls the radio unit 21 and radar detector 14 to detect a radar pulse signal. It is preferable that the radar pulse detection process be performed using the radio unit 21 and radar detector 14 immediately after the start of the idle time.

Further, even if one idle period (e.g., IDLE period T1 in FIG. 6) is rather shorter than the predetermined time, if the sum of idle periods during a certain term exceeds the predetermined time, radar detection can be accomplished by performing radar detection in each idle period. Specifically, radar detection is started in the first idle period, and is resumed in the second idle period in the range that was not scanned in the first idle period. This range indicates the following range: Assuming that 60 seconds are required for detecting a radar signal, and 40 seconds have been spent in the first idle period, the above-mentioned range indicates the range to be scanned in 20 seconds after (60×N [N: a natural number]) seconds elapse from the end of the first idle period. Thus, the whole area around the radio communication apparatus of the embodiment can be scanned for radar detection, therefore a radar signal, if there is, can be detected.

Figure 6:
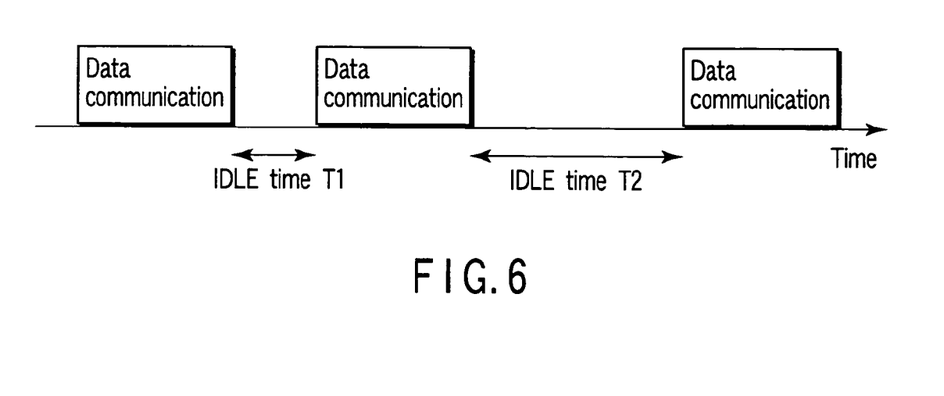
FIG. 6 is a view useful in explaining an idle time that occurs when the radio communication apparatus of FIG. 5 performs data communication.

In the above case, radar detection is performed using a period, in which data communication is suspended, as shown in FIG. 6. Alternatively, radar detection may be performed if it is determined that the data received is unnecessary one for the user of the radio communication apparatus. For example, when the user receives audio/visual information, CM data may be an example of typical unnecessary data. In this case, it is determined whether or not the received data is CM data, and radar detection is performed if it is determined CM data. Further, if reception information indicating when CM data is received can be acquired in advance, radar detection can be performed with premeditation, using the reception information. The controller 18 also performs the following operation described referring to FIG. 7.

Figure 7:
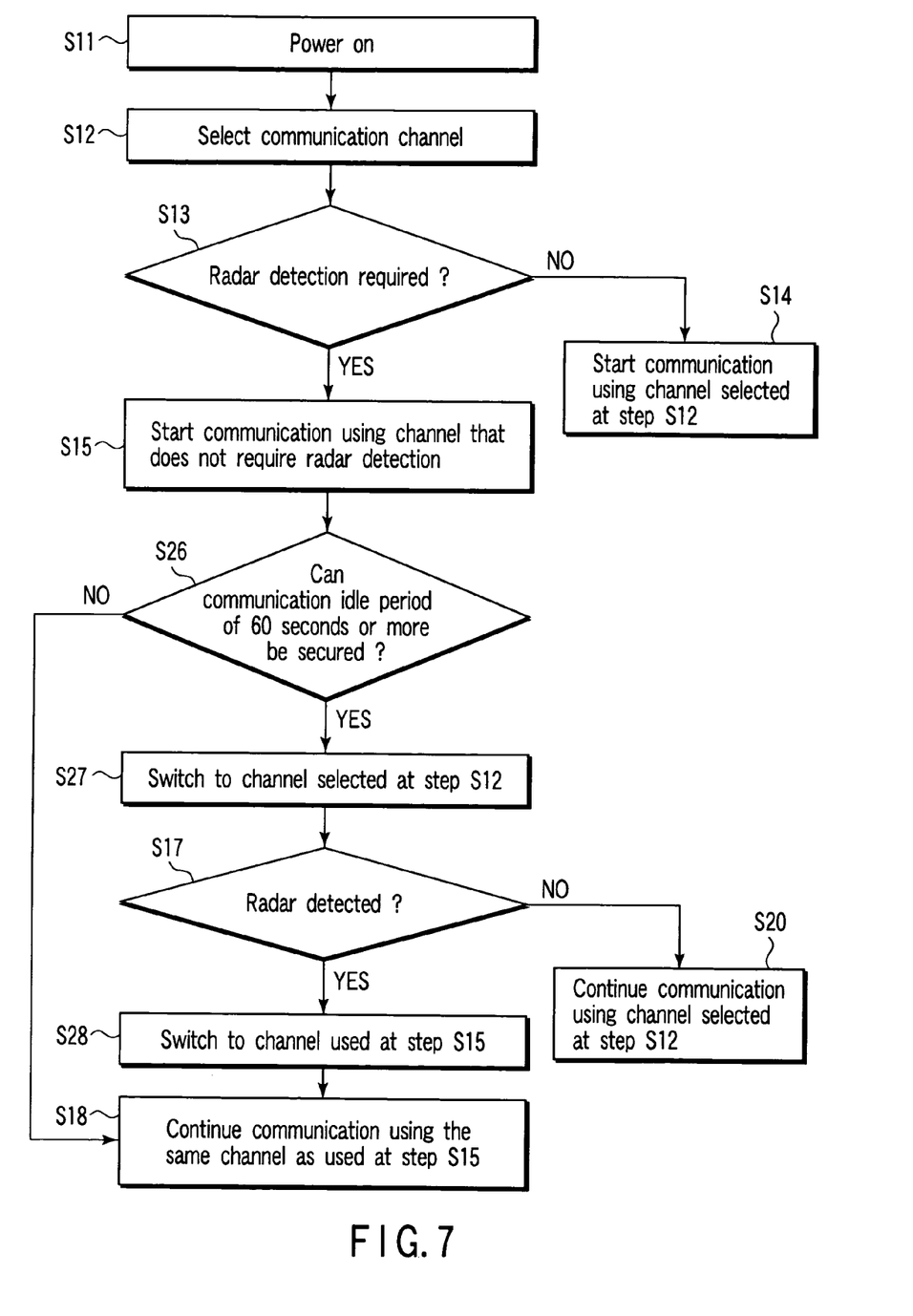
FIG. 7 is a flowchart useful in explaining an operation example of the radio communication apparatus shown in FIG. 5.

Referring to the flowchart of FIG. 7, a description will be given of another operation example of the radio communication apparatus 20. In FIG. 7, steps similar to those in the flowchart of FIG. 4 directed to the first embodiment are denoted by corresponding reference numerals, and no description is given thereof.

Figure 4:
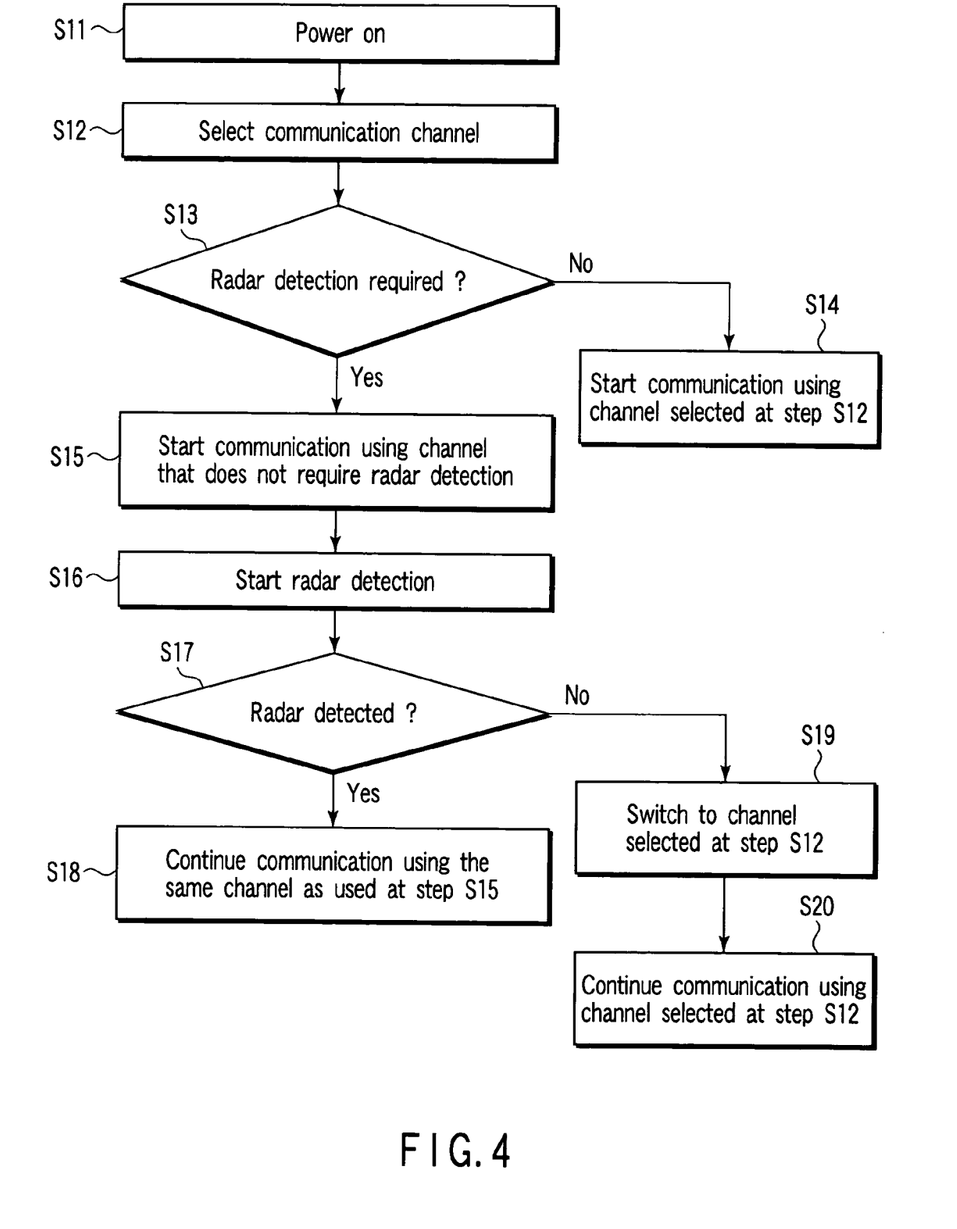
FIG. 4 is a flowchart useful in explaining an operation example of the radio communication apparatus shown in FIG. 1.

Firstly, the radio communication apparatus 20 performs similar operations to those performed at steps S11 to S15 in FIG. 4. At step S15, the controller 18 selects, from channel information, a channel that does not require radar detection, and starts data communication using this channel. After that, the controller 28 determines whether or not a predetermined idle period or unnecessary data-receiving period (60 seconds or more if the period should conform to ETSI EN 301 893 v1.2.2) can be secured (step S26). In other words, the controller 28 determines whether or not there exists, from now on, an idle or unnecessary-data-reception period not less than a predetermined period. It is desirable that this determination be performed periodically or with premeditation. If it is determined that an idle or unnecessary-data-reception period not less than a predetermined period can be acquired, the process proceeds to step S27. On the other hand, if it is determined that an idle or unnecessary-data-reception period not less than a predetermined period cannot be acquired, the process proceeds to step S18. At step S18, communication is continued using the channel with which communication is started at step S15.

At step S27, the channel is switched to that selected by the channel selector 16 at step S12, whereby the radar detector 14 determines whether or not the signal received by the radio unit 21 is a radar pulse signal (step S17). If the received signal is a radar pulse signal, the process proceeds to step S28, whereas if it is not a radar pulse signal, the process proceeds to step S20. At step S28, the channel is switched to that with which communication is started at step S15, thereby continuing communication using this channel (step S18).

As described above, the radio communication apparatus of the second embodiment cannot concurrently perform data communication and radar detection as background processing, since it employs only one radio unit. However, in the second embodiment, radar detection is performed during a period in which no data communication is performed, or a period in which unnecessary data for the user is received. Accordingly, communication can be started almost immediately after the start of communication that conforms to ETSI EN 301 893 v1.2.2 is attempted.

Third Embodiment

Figure 8:
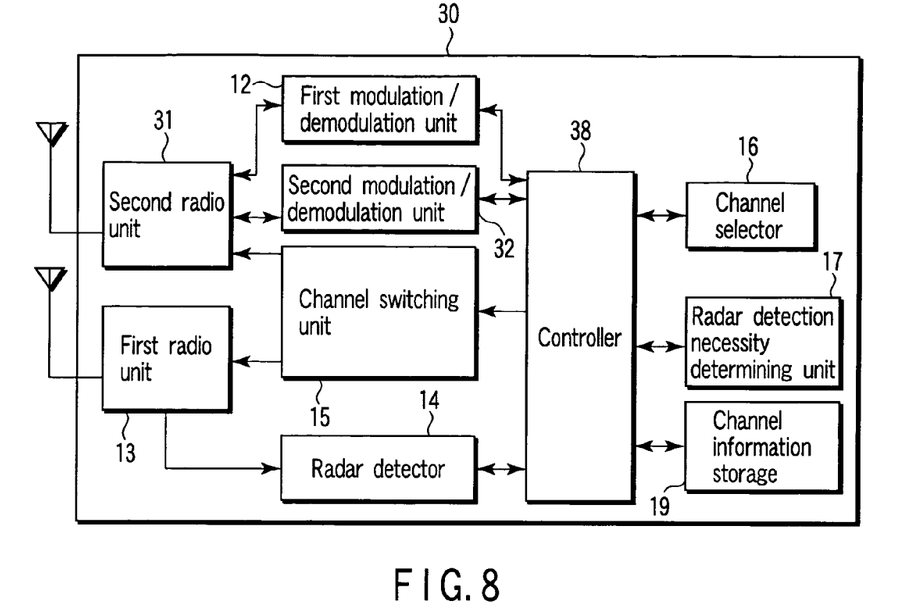
FIG. 8 is a block diagram illustrating a radio communication apparatus according to a third embodiment of the invention.

Referring to FIG. 8, a radio communication apparatus 30 according to a third embodiment of the invention will be described.

The radio communication apparatus 30 of the third embodiment is obtained by modifying the radio communication apparatus 10 of the first embodiment such that the second radio unit 11 and modulation/ demodulation unit 12 can utilize two types of modulation schemes for communication. Specifically, the radio communication apparatus 30 has a second radio unit 31, first modulation/demodulation unit 12 and second modulation/demodulation unit 32, instead of the second radio unit 11 and modulation/demodulation unit 12. In the radio communication apparatus 30, elements similar to those of the radio communication apparatus 10 are denoted by corresponding reference numerals, and no description is given thereof. As seen from FIG. 8, the radio communication apparatus 30 comprises a second radio unit 31, first modulation/demodulation unit 12 (this has the same structure as the modulation/demodulation unit 12 employed in the first embodiment) and second modulation/demodulation unit 32. The apparatus 30 further comprises a first radio unit 13, radar detector 14, channel switching unit 15, channel selector 16, radar detection necessity determining unit 17, controller 38 and channel information storage 39.

The second radio unit 31 enables data reception/transmission based on two types of radio communication schemes. Specifically, the second radio unit 31 realizes radio communication of, for example, OFDM and SS (Spread Spectrum). The first modulation/demodulation unit 12 modulates and demodulates signals of, for example, OFDM.

The second modulation/demodulation unit 32 modulates and demodulates signals of a communication scheme, such as SS, different from the communication scheme employed in the first modulation/demodulation unit 12.

The controller 38 differs from the controller 18 of the first embodiment in that the former performs control for executing a similar operation to that explained in the first embodiment, with the communication scheme changed. Specifically, if usable channels are contained in different frequency bands (for example, the 5-GHz bands shown in FIG. 3 and a 2-GHz band), both the 5-GHz and 2-GHz bands are utilized to select a channel that does not require radar detection. For example, the 2-GHz band is included to select a channel therefrom at step S12, and further, communication is started, at step S15, firstly using a channel included in the 2-GHz band as a channel that does not require radar detection. In the third embodiment, since it is assumed that different communication schemes are used in different frequency bands, the controller 38 controls the first and second modulation/demodulation units 12 and 32 so that different modulation/demodulation units are used in the 5-GHz and 2-GHz bands respectively.

Figure 9:
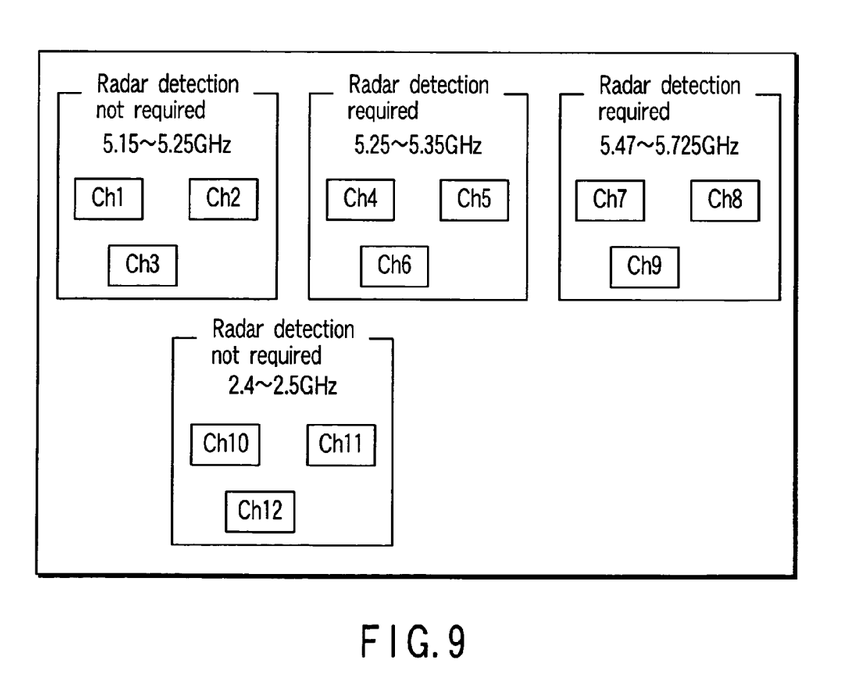
FIG. 9 is a view illustrating channel information stored in the channel information storage shown in FIG. 8.

The channel information storage 39 has the same structure as the channel information storage 19, and stores information indicating frequency bands containing channels, the types of channels contained in the bands, and whether or not each of the frequency bands requires radar detection. The stored channel information includes information concerning the 2-GHz band shown in FIG. 9, as well as the channels shown in FIG. 3.

Although in the above case, different modulation/demodulation units are used in the 5-GHz and 2-GHz bands respectively, the same modulation/ demodulation unit can be used in the 5-GHz and 2-GHz bands if a single radio unit uses a single communication scheme for the 5-GHz and 2-GHz bands.

As described above, since the radio communication apparatus of the third embodiment can use a large number of channels that do not require radar detection, it can easily find a channel usable for data communication. Further, communication can be started, without spending as much time as 60 seconds or more on radar detection, almost immediately after the start of communication that conforms to ETSI EN 301 893 v1.2.2 is attempted.

The flow charts of the embodiments illustrate methods according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus configured to communicate with a radar system and a radio communication system, comprising:

a storage configured to store first information and second information, the first information indicating at least one first communication channel which is used by the radar system if a signal of the radar system is detectable, the second information indicating at least one second communication channel which fails to be used by the radar system;

a selector configured to randomly select a third communication channel from a plurality of communication channels including the first communication channel and the second communication channel if a communication is performed using the radio communication system;

a determination unit configured to determine whether or not the third communication channel is identical to the at least one first communication channel, referring to the first information;

a radio unit configured to communicate with the radar system by receiving a signal through the third communication channel and communicate with the radio communication system;

a detector configured to detect whether or not the signal received in the radio unit is used in the radar system;

an idle time determining unit configured to determine whether or not an idle time not less than a period is secured if the determination unit determines that the third communication channel is identical to the at least one first communication channel, the idle time corresponding to a period in which data fails to be transmitted or received during the communication by the radio communication system; and a controller configured to control the radio unit to start the communication using the second communication channel if the determination unit determines that the third communication channel is identical to the at least one first communication channel, the controller configured to start the communication using the third communication channel if the determination unit determines that the third communication channel is not identical to the at least one first communication channel, the controller configured to control the radio unit to switch from the second communication channel to the third communication channel if the determination unit determines that the third communication channel is identical to the at least one first communication channel and if the idle time determining unit determines that the idle time is secured, the controller configured to control the radio unit to switch from the third communication channel to the second communication channel and continue to communicate with the radio communication system using the second communication channel to which the controller switches if the determination unit determines that the third communication channel is identical to the at least one first communication channel if the idle time determining unit determines that the idle time is secured and if the detector detects that the signal received in the radio unit is used in the radar system, the controller configured to control the radio unit to continue to communicate with the radio communication system using the third communication channel to which the controller switches if the determination unit determines that the third communication channel is identical to the at least one first communication channel if the idle time determining unit determines that the idle time is secured and if the detector detects that the signal received in the radio unit fails to be used in the radar system, the controller configured to control the radio unit to continue to communicate with the radio communication system using the second communication channel by the radio unit if the determination unit determines that the third communication channel is identical to the at least one first communication channel and if the idle time determining unit determines that the idle time fails to be secured, wherein the radio communication system includes a plurality of radio communication systems employing an orthogonal frequency division multiplexing scheme and a spread spectrum scheme, and the apparatus further comprises a modulation/demodulation unit configured to modulate and demodulate signals which are compatible with the plurality of radio communication systems employing an orthogonal frequency division multiplexing scheme and a spread spectrum scheme.

2. The apparatus according to claim 1, wherein the radio communication system is a wireless local area network system.

3. A radio communication method, comprising:

storing first information and second information, the first information indicating at least one first communication channel which is used by a radar system if a signal of the radar system is detectable, and the second information indicating at least one second communication channel which fails to be used by the radar system and is used by a radio communication system;

randomly selecting a third communication channel from a plurality of communication channels including the first communication channel and the second communication channel if a communication is performed using a radio communication system;

determining whether or not the third communication channel is identical to the at least one first communication channel, referring to the first information;

preparing a radio unit configured to communicate with the radar system by receiving a signal through the third communication channel and communicate with the radio communication system;

detecting whether or not the signal received in the radio unit is used in the radar system;

determining whether or not an idle time not less than a period is secured if it is determined that the third communication channel is identical to the at least one first communication channel, the idle time corresponding to a period in which data fails to be transmitted or received during the communication by the radio communication system;

controlling the radio unit to start the communication using the second communication channel if it is determined that the third communication channel is identical to the at least one first communication channel;

controlling the radio unit to start the communication using the third communication channel if it is determined that the third communication channel is not identical to the at least one first communication channel;

controlling the radio unit to switch from the second communication channel to the third communication channel if it is determined that the third communication channel is identical to the at least one first communication channel and if it is determined that the idle time is secured;

controlling the radio unit to switch from the third communication channel to the second communication channel and continue to communicate with the radio communication system using the second communication channel if it is determined that the third communication channel is identical to the at least one first communication channel if it is determined that the idle time is secured and if it is detected that the signal received in the radio unit is used in the radar;

controlling the radio unit to continue to communicate with the radio communication system using the third communication channel if it is determined that the third communication channel is identical to the at least one first communication channel if it is determined that the idle time is secured and if the detector detects that the signal received in the radio unit fails to be used in the radar system; and controlling the radio unit to continue to communicate with the radio communication system using the second communication channel by the radio unit if it is determined that the third communication channel is identical to the at least one first communication channel and if it is determined that the idle time fails to be secured, wherein the radio communication system includes a plurality of radio communication systems employing an orthogonal frequency division multiplexing scheme and a spread spectrum scheme, and the method further comprises modulating and demodulating signals which are compatible with the plurality of radio communication systems employing an orthogonal frequency division multiplexing scheme and a spread spectrum scheme.

4. A radio communication apparatus configured to communicate with a radar system and a radio communication system, comprising:
- a storage configured to store first information and second information, the first information indicating at least one first communication channel which is used by the radar system if a signal of the radar system is detectable, the second information indicating at least one second communication channel which fails to be used by the radar system;
- a selector configured to randomly select a third communication channel from a plurality of communication channels including the first communication channel and the second communication channel if a communication is performed using the radio communication system;
- a determination unit configured to determine whether or not the third communication channel is identical to the at least one first communication channel, referring to the first information;
- a radio unit configured to communicate with the radar system by receiving a signal through the third communication channel and communicate with the radio communication system;
- a detector configured to detect whether or not the signal received in the radio unit is used in the radar system;
- an idle time determining unit configured to determine whether or not an idle time not less than a period is secured if the determination unit determines that the third communication channel is identical to the at least one first communication channel, the idle time corresponding to a period in which data fails to be transmitted or received during communication by the radio communication system; and
- a controller configured to control the radio unit to start the communication using the second communication channel if the determination unit determines that the third communication channel is identical to the at least one first communication channel, the controller configured to start the communication using the third communication channel if the determination unit determines that the third communication channel is not identical to the at least one first communication channel, the controller configured to control the radio unit to switch from the second communication channel to the third communication channel if the determination unit determines that the third communication channel is identical to the at least one first communication channel and if the idle time determining unit determines that the idle time is secured, the controller configured to control the radio unit to switch from the third communication channel to the second communication channel and continue to communicate with the radio communication system using the second communication channel to which the controller switches if the determination unit determines that the third communication channel is identical to the at least one first communication channel if the idle time determining unit determines that the idle time is secured and if the detector detects that the signal received in the radio unit is used in the radar system, the controller configured to control the radio unit to continue to communicate with the radio communication system using the third communication channel to which the controller switches if the determination unit determines that the third communication channel is identical to the at least one first communication channel if the idle time determining unit determines that the idle time is secured and if the detector detects that the signal received in the radio unit fails to be used in the radar system, the controller configured to control the radio unit to continue to communicate with the radio communication system using the second communication channel by the radio unit if the determination unit determines that the third communication channel is identical to the at least one first communication channel and if the idle time determining unit determines that the idle time fails to be secured, wherein
- the radio communication system includes a plurality of radio communication systems employing an orthogonal frequency division multiplexing scheme and a spread spectrum scheme,
- the apparatus further comprises a modulation/demodulation unit configured to modulate and demodulate signals which are compatible with the plurality of radio communication systems employing an orthogonal frequency division multiplexing scheme and a spread spectrum scheme, and
- the controller is configured to switch from the second communication channel to the third communication channel if the idle time is less than the period and if a sum of idle periods during a term exceeds the period.

5. A radio communication apparatus configured to communicate with a radar system and a radio communication system, comprising:
- a storage configured to store first information and second information, the first information indicating at least one first communication channel which is used by the radar system if a signal of the radar system is detectable, the second information indicating at least one second communication channel which fails to be used by the radar system;
- a selector configured to randomly select a third communication channel from a plurality of communication channels including the first communication channel and the second communication channel if a communication is performed using the radio communication system;
- a determination unit configured to determine whether or not the third communication channel is identical to the at least one first communication channel, referring to the first information;
- a radio unit configured to communicate with the radar system by receiving a signal through the third communication channel and communicate with the radio communication system;
- a detector configured to detect whether or not the signal received in the radio unit is used in the radar system;
- an idle time determining unit configured to determine whether or not an idle time not less than a period is secured if the determination unit determines that the third communication channel is identical to the at least one first communication channel, the idle time corresponding to a period in which data fails to be transmitted or received during the communication by the radio communication system; and
- a controller configured to control the radio unit to start the communication using the second communication channel if the determination unit determines that the third communication channel is identical to the at least one first communication channel, the controller configured to start the communication using the third communication channel if the determination unit determines that the third communication channel is not identical to the at least one first communication channel, the controller configured to control the radio unit to switch from the second communication channel to the third communication channel if the determination unit determines that the third communication channel is identical to the at least one first communication channel and if the idle time determining unit determines that the idle time is secured, the controller configured to control the radio unit to switch from the third communication channel to the second communication channel and continue to communicate with the radio communication system using the second communication channel to which the controller switches if the determination unit determines that the third communication channel is identical to the at least one first communication channel if the idle time determining unit determines that the idle time is secured and if the detector detects that the signal received in the radio unit is used in the radar system, the controller configured to control the radio unit to continue to communicate with the radio communication system using the third communication channel to which the controller switches if the determination unit determines that the third communication channel is identical to the at least one first communication channel if the idle time determining unit determines that the idle time is secured and if the detector detects that the signal received in the radio unit fails to be used in the radar system, the controller configured to control the radio unit to continue to communicate with the radio communication system using the second communication channel by the radio unit if the determination unit determines that the third communication channel is identical to the at least one first communication channel and if the idle time determining unit determines that the idle time fails to be secured, wherein the radio communication system includes a plurality of radio communication systems employing an orthogonal frequency division multiplexing scheme and a spread spectrum scheme, the apparatus further comprises a modulation/demodulation unit configured to modulate and demodulate signals which are compatible with the plurality of radio communication systems employing an orthogonal frequency division multiplexing scheme and a spread spectrum scheme, and the controller is configured to switch from the second communication channel to the third communication channel if it is determined that data received is unnecessary for a user of the radio communication apparatus.

* * * * *